United States Patent
Hars et al.

(10) Patent No.: US 11,509,640 B2
(45) Date of Patent: Nov. 22, 2022

(54) METHOD FOR PROTECTING AN ELECTRONIC CONTROL UNIT

(71) Applicant: APTIV TECHNOLOGIES LIMITED, St. Michael (BB)

(72) Inventors: Aurelien Hars, Dusseldorf (DE); Hussein Baydoun, Gummersbach (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 218 days.

(21) Appl. No.: 16/850,328

(22) Filed: Apr. 16, 2020

(65) Prior Publication Data

US 2020/0358748 A1 Nov. 12, 2020

(30) Foreign Application Priority Data

May 10, 2019 (EP) .................. 19173810

(51) Int. Cl.
*H04L 9/40* (2022.01)
*H04W 4/44* (2018.01)
*G06F 12/14* (2006.01)
*H04L 9/00* (2022.01)
*H04L 9/08* (2006.01)
*H04N 21/443* (2011.01)
*G06F 21/12* (2013.01)
*G06F 21/57* (2013.01)
*G06F 21/74* (2013.01)
*G06F 21/44* (2013.01)

(52) U.S. Cl.
CPC .......... *H04L 63/06* (2013.01); *G06F 12/1433* (2013.01); *G06F 21/12* (2013.01); *G06F 21/575* (2013.01); *G06F 21/74* (2013.01); *H04L 9/006* (2013.01); *H04L 9/0825* (2013.01); *H04N 21/4432* (2013.01); *H04W 4/44* (2018.02); *G06F 21/44* (2013.01)

(58) Field of Classification Search
CPC ....... H04L 63/06; H04L 9/006; H04L 9/0825; H04L 9/3247; H04L 9/16; H04L 9/0643; G06F 12/1433; G06F 21/51; G06F 21/575; G06F 21/74; G06F 21/44; G06F 21/12; H04N 21/4432; H04W 4/44
See application file for complete search history.

(56) References Cited

U.S. PATENT DOCUMENTS

| | | | |
|---|---|---|---|
| 10,991,175 B2 * | 4/2021 | Zhang | H04L 63/062 |
| 11,042,816 B2 * | 6/2021 | Zaid | H04W 4/027 |
| 11,055,615 B2 * | 7/2021 | Litichever | H04L 12/40 |

(Continued)

FOREIGN PATENT DOCUMENTS

EP  2484564 A1 *  8/2012  ............. B60R 25/04

OTHER PUBLICATIONS

Extended European Search Report for Application No. EP 19 17 3810 dated Jul. 8, 2019.

*Primary Examiner* — Cheng-Feng Huang
(74) *Attorney, Agent, or Firm* — Carlson, Gaskey & Olds, P.C.

(57) ABSTRACT

A method for operating an electronic control unit (ECU) includes a normal mode and a protected mode. In the protected mode a new security artifact is stored in a microcontroller. The security artifact is transferred from the microcontroller to a microprocessor, and, after having received the security artifact, the microprocessor uses the security artifact for authenticating a program.

14 Claims, 4 Drawing Sheets

(56) References Cited

U.S. PATENT DOCUMENTS

| | | | |
|---|---|---|---|
| 11,086,327 B2* | 8/2021 | Sundar Pal | G01C 21/3461 |
| 11,379,587 B2* | 7/2022 | Hong | H04W 12/10 |
| 2008/0179401 A1* | 7/2008 | Hart | G07F 7/0893 |
| | | | 235/449 |
| 2013/0111203 A1* | 5/2013 | Baltes | H04L 9/3247 |
| | | | 713/100 |
| 2018/0270196 A1* | 9/2018 | Bathurst | H04L 12/40032 |
| 2019/0012483 A1* | 1/2019 | Thompson | G06F 21/78 |
| 2019/0385057 A1* | 12/2019 | Litichever | H04L 63/14 |
| 2020/0134186 A1* | 4/2020 | Hong | G06F 21/572 |
| 2020/0211301 A1* | 7/2020 | Zhang | H04L 63/065 |
| 2020/0389469 A1* | 12/2020 | Litichever | H04L 63/029 |

\* cited by examiner

METHOD FOR PROTECTING AN ELECTRONIC CONTROL UNIT

CROSS REFERENCE TO RELATED APPLICATION

This application claims priority to European Patent Application No. 19173810.3, filed on May 10, 2019.

FIELD

The present disclosure relates to a method for protecting an electronic control unit (ECU). The disclosure also relates to an ECU and a vehicle having an ECU.

BACKGROUND

ECUs are widely used for different applications, particularly in the automotive field. ECUs are for example used for autonomous driving, multimedia, telematics and similar tasks. For this purpose, the ECUs may comprise a microprocessor which performs data processing and executes, for example, a software program enabling the ECU to perform its task.

In order to prevent undesired changes or amendments to the software program, the software program may be signed by a car manufacturer, for example using a private key. The ECU may comprise a public key of the car manufacturer and can then verify that the software program actually originates from the car manufacturer.

However, in case the private key of the car manufacturer is stolen or the cryptographic technology used for signing the software program is broken, problems may arise. An attacker having obtained the private key could then distribute new software programs to the ECU, wherein also the new software programs may be signed with the private key. The new software program could be malicious or dangerous. Such a theft of the private key may therefore necessitate the destruction of ECUs that are based on the public key corresponding to the stolen private key.

Accordingly, there is a need to improve the security of ECUs against attacks based on a stolen private key.

SUMMARY

In one aspect, the present disclosure is directed at a method for protecting an electronic control unit (ECU) that includes a microprocessor, a microcontroller and a storage memory. The method includes storing a first security artifact in the microprocessor, storing a first program in the storage memory. The first program is based on the first security artifact. In a normal mode, the first program is transferred from the storage memory to the microprocessor, the microprocessor authenticates the first program based on the first security artifact, and in case the first program is successfully authenticated, the microprocessor executes the first program. In a protected mode, a second security artifact is stored in the microcontroller, the second security artifact is transferred from the microcontroller to the microprocessor before a transfer of the first program from the storage memory to the microprocessor. After having received the second security artifact, the microprocessor uses, preferably only, the security artifact for authenticating a program, such as the first program, to be executed by the microprocessor.

The method disclosed herein involves a microprocessor, a microcontroller and a storage memory. The microprocessor, the microcontroller and the storage memory may all be individual integrated circuits (ICs) but may be arranged within the same housing and/or on the same printed circuit board (PCB) of the ECU. The microprocessor, the microcontroller and the storage memory may be connected via electrical lines in order to allow a data exchange between the microprocessor, the microcontroller and the storage memory.

The microprocessor may be provided with a first security artifact. The first security artifact may be a public key, a cryptographic key or a logic. The first security artifact may be of any nature that allows the first security artifact to verify or authenticate the first program. The first security artifact may be stored in the microprocessor. Furthermore, the storage memory may store the first program. The first program may be based on the first security artifact.

"Based on", as used herein, is to be understood as a relation between a security artifact and a program. For example, if the first security artifact is a public key, then the first program may comprise a signature created using a private key corresponding to the public key of the first security artifact.

The method disclosed herein comprises two different operation modes. The normal mode is used when no security breach is present, such as when no security artifact or no private key has been stolen.

In normal mode, the first program may be transferred from the storage memory to, for example, a volatile memory of the microprocessor, wherein the microprocessor then authenticates the first program using the first security artifact. For example, if the first security artifact is a public key, the microprocessor verifies if the first program has actually been signed with the private key corresponding to the public key. After successfully authenticating the first program, the microprocessor then executes the first program. The first program may be a software that allows the ECU to perform an autonomous driving task.

For signing the first program (or any program) with a private key, the program may be hashed, i.e. a hash value is generated from the program. The hash value may then be encrypted using the (first) private key thereby generating a digital signature. To verify or authenticate the program, the microprocessor may also generate the hash value from the program. The microprocessor may also decrypt the digital signature using the (first) public key, yielding a decrypted hash value. If the decrypted hash value and the hash value generated by the microprocessor are identical, then the program is considered as successfully authenticated.

Instead of using a digital signature, it is also possible to use different methods, such as a challenge and response method to authenticate the program.

In case it is detected that a security breach is present and, for example, a public key has been stolen, the ECU may then be switched to protected mode. In the protected mode, a second security artifact is stored in the microcontroller. The microcontroller may act as a companion chip for the microprocessor. The second security artifact may be a new public key that corresponds to a newly generated private key (and therefore is not known to an attacker). The second security artifact is then transferred from the microcontroller to the microprocessor before the first program is transferred from the storage memory to the microprocessor. After the transfer of the security artifact, the microprocessor will use (only) the second security artifact for authenticating the first program or any program that the microprocessor receives from the storage memory. If it is assumed that an attacker has stolen the first private key (but not the new private key), the attacker could then distribute software programs that are authenticated based on the first security artifact and then executed on the ECU. However, as the second security artifact is transferred before the potentially malicious first program is transferred to the microprocessor, the microprocessor will then always use the second security artifact for verifying the first program. A first program written by an attacker and based on the first security artifact will then not be authenticated anymore and will not be executed by the ECU. Thereby a protection against the execution of potentially malicious software is achieved.

According to an embodiment, the microprocessor requests the transfer of the first program. This may happen in both the normal mode and the protected mode. In the protected mode, the request is redirected to the microcontroller. For example, the microcontroller may use a "chip select" line of the storage memory to switch off the storage memory and thus to redirect or divert the request to itself. For this purpose, a data connection between the microprocessor and the microcontroller may exist. The microcontroller may also be connected to the chip select line. Furthermore, the microcontroller may monitor other signal lines, such as write/read enable, output enable or write protection of the storage memory.

Upon redirecting the request for the transfer of the first program, the microcontroller may transfer the second security artifact to the microprocessor. The second security artifact may comprise program code that may be executed by the microprocessor. The second security artifact may cause the microprocessor to use the second security artifact for authenticating the first program or any program received after the second security artifact.

In other words, the microcontroller may play the role of an "attacker", as it may redirect the request of the microprocessor and may attribute the second security artifact falsely as the first program to the microprocessor. The second security artifact then changes the behavior of the microprocessor and thereby allows programs signed with or based on the first security artifact to be excluded from execution.

According to an embodiment, the first security artifact comprises a first public key, wherein the first program is signed with a first private key, the first public key and the first private key are forming a first key pair. The first public key and the first private key may form an asymmetric key pair, wherein signing the first program is performed using the first private key.

According to an embodiment, the second security artifact comprises a second public key, wherein a second program is signed with a second private key, the second public key and the second private key form a second key pair. The second program will be described in more detail later.

The first and/or second public key may be stored in the microprocessor and/or the microcontroller as a digital copy or merely as a hash value of the public key.

According to an embodiment, the second security artifact comprises a bootstrap, wherein the bootstrap is based on the first security artifact. Particularly, the bootstrap may be signed with the first private key and may thus be verified with the first public key of the first security artifact. The bootstrap may be stored by the microprocessor and then be verified using the first security artifact. The bootstrap may then trigger the microprocessor to (only) use the second security artifact for authenticating any further programs transferred to the microprocessor (e.g., the second program).

According to an embodiment, the first security artifact is stored in the microprocessor in an unchangeable manner. For example, the first security artifact may be stored in the microprocessor using fuses or eFuses. The fuses may be burned during production of the ECU or the microprocessor. Alternatively or additionally, the first security artifact may be stored in a one-time-programming-memory (OTP-memory) of the microprocessor.

Alternatively or additionally, the first security artifact may comprise a cryptographic key of a symmetric cryptographic method. Furthermore, the first security artifact may comprise a logic (e.g., stored as software commands) which comprises, for example, a predefined combination of NOT, AND, OR and/or XOR operations. The logic may be used to verify and/or authenticate the first and/or second program and/or the bootstrap.

According to an embodiment, the protected mode is entered when the microcontroller receives the second security artifact. The security artifact may be stored in a secure memory of the microcontroller. Upon reception of the second security artifact, the microcontroller may be triggered to redirect the request for the first program and thereby execute the protected mode.

The second security artifact may be stored in a hardware security module (HSM) of the microcontroller and/or in a secure flash of the microcontroller. The HSM and the secure flash protect the second security artifact against an attacker. The use of an HSM or a secure flash also protects against an attacker transferring his/her own second security artifact into the microcontroller.

The HSM and/or the secure flash (i.e. the secure memory) may be protected using a third security artifact. The third security artifact may comprise a root certificate and/or master key. For example, the third security artifact may be necessary to store the second security artifact in the microcontroller. Thereby only the car manufacturer is able to provide the second security artifact to the microprocessor.

For example, the second security artifact and/or the third security artifact may be received wirelessly. A car manufacturer may provide the second security artifact to an entire fleet of vehicles that comprise ECUs with first security artifacts that are not secure. Thereby, an entire fleet may be protected against an attacker.

According to an embodiment, the second program is stored in the storage memory, and the second program is based on the second security artifact. The second program may also be received wirelessly. Together with transferring the second security artifact into the secure memory of the microcontroller, the second program may be transferred into the storage memory. The second program may for example be signed with the second private key corresponding to the second security artifact.

The second program may replace or overwrite the first program in the storage memory.

During operation of the protected mode, the bootstrap of the second security artifact causes the microprocessor to load the program (or any program) stored in the storage memory, such as the second program, into the memory of the microprocessor. Since the second program is based on the second security artifact, the second public key may be used to verify the origin of the second program. After having authenticated the second program successfully using the second security artifact, the microprocessor then executes the second program.

The second program (as well as the first program) may comprise bootloaders and/or application programs. For example, the second program may comprise an application for autonomous driving or an adaptive cruise control (ACC).

According to an embodiment, the first and/or the second program are stored in a volatile memory of the microprocessor. Particularly, the first and/or second programs are stored in a random access memory (RAM) of the microprocessor after the transfer from the storage memory. The storage memory may be a non-volatile memory, such as a flash memory. The storage memory could also be an (unprotected) memory of the microcontroller or, as indicated earlier, a dedicated/separate memory chip.

According to an embodiment, the method steps of the normal mode and of the protected mode are respectively executed during the boot-phase of the ECU, wherein a start-up of the microcontroller is performed before the start-up of the microprocessor. Due to the microcontroller starting before the microprocessor, the microcontroller may redirect the microprocessor's request for the first program to its own secure memory. Thereby the ability of the ECU to be switched to a new security artifact (e.g., the second key pair) is achieved.

The microprocessor and/or the microcontroller may comprise secure boot capabilities, to further increase the security of the ECU.

In another aspect, the present disclosure is directed at an electronic control unit (ECU) comprising a microprocessor, a microcontroller and a storage memory. The microprocessor stores a first security artifact. The microcontroller is adapted to run in a normal mode and a protected mode. During the normal mode, the microprocessor is adapted to receive or receives a first program which is stored in the storage memory. The first program is based on the first security artifact. The microprocessor is adapted to authenticate or authenticates the first program based on the first security artifact, and in case the first program is successfully authenticated, to execute the first program. During the protected mode, the microcontroller stores a second security artifact and transfers the second security artifact to the microprocessor before the microprocessor receives the first program from the storage memory. The microprocessor is adapted to use or uses, preferably only, the second security artifact for authenticating a program to be executed by the microprocessor, such as the first program, after having received the second security artifact.

According to an embodiment, the ECU performs an autonomous driving function and/or an adaptive cruise control function.

According to an embodiment, the microprocessor comprises a volatile memory for storing the first program. The microprocessor may comprise a non-re-programmable non-volatile memory but no re-programmable non-volatile memory. The microcontroller may comprise a protected re-programmable non-volatile memory, such as a HSM or a secure flash.

The microprocessor may be formed by one of the following processors: Renesas R-Car, Intel Denverton or TI Jacinto.

The microcontroller may be formed by one of the following controllers: Infineon Aurix2G TC3xx, Renesas RH850 Flx or ST Chorus.

As an example, the size of the first and/or second security artifact may be below 100 kByte. Particularly, the first and/or second public key may have a length of 1024, 2048 or 4096 bit. The first and/or second program may be 10× or even 100× larger than the first and/or second security artifact and may have a size of more than 10 MByte or more than 20 MByte.

In another aspect, the present disclosure is directed at a vehicle comprising the ECU as described herein.

The features and embodiments disclosed herein with respect to the method are also valid with respect to the ECU and the vehicle.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection, for example an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings. The drawings are showing schematically.

DETAILED DESCRIPTION

Figure 1:
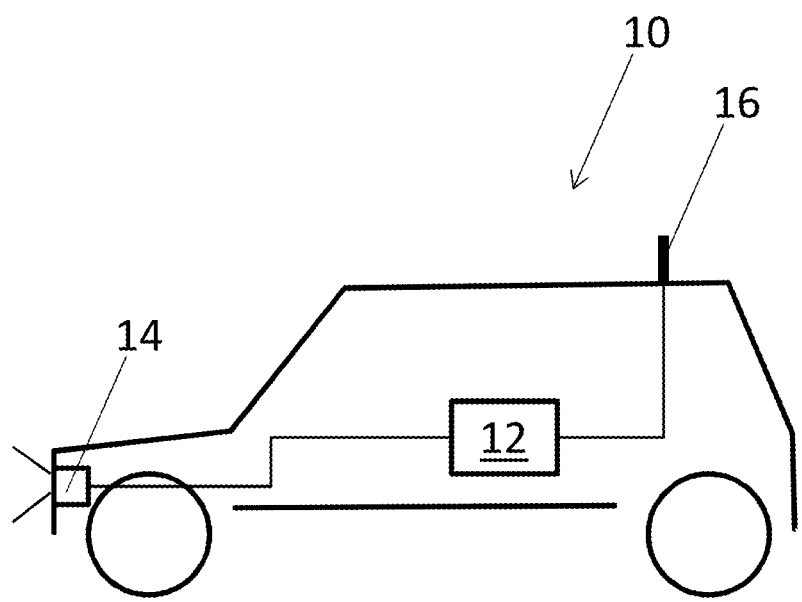
FIG. 1 a vehicle with an electronic control unit (ECU)

FIG. 1 shows a vehicle 10 with an ECU 12. The ECU 12 is connected to a radar-device 14 that allows the ECU 12 to perform functions of an adaptive cruise control (ACC). The ECU 12 is connected to a wireless data network (e.g., 4G or 5G) via an antenna 16.

Figure 2:
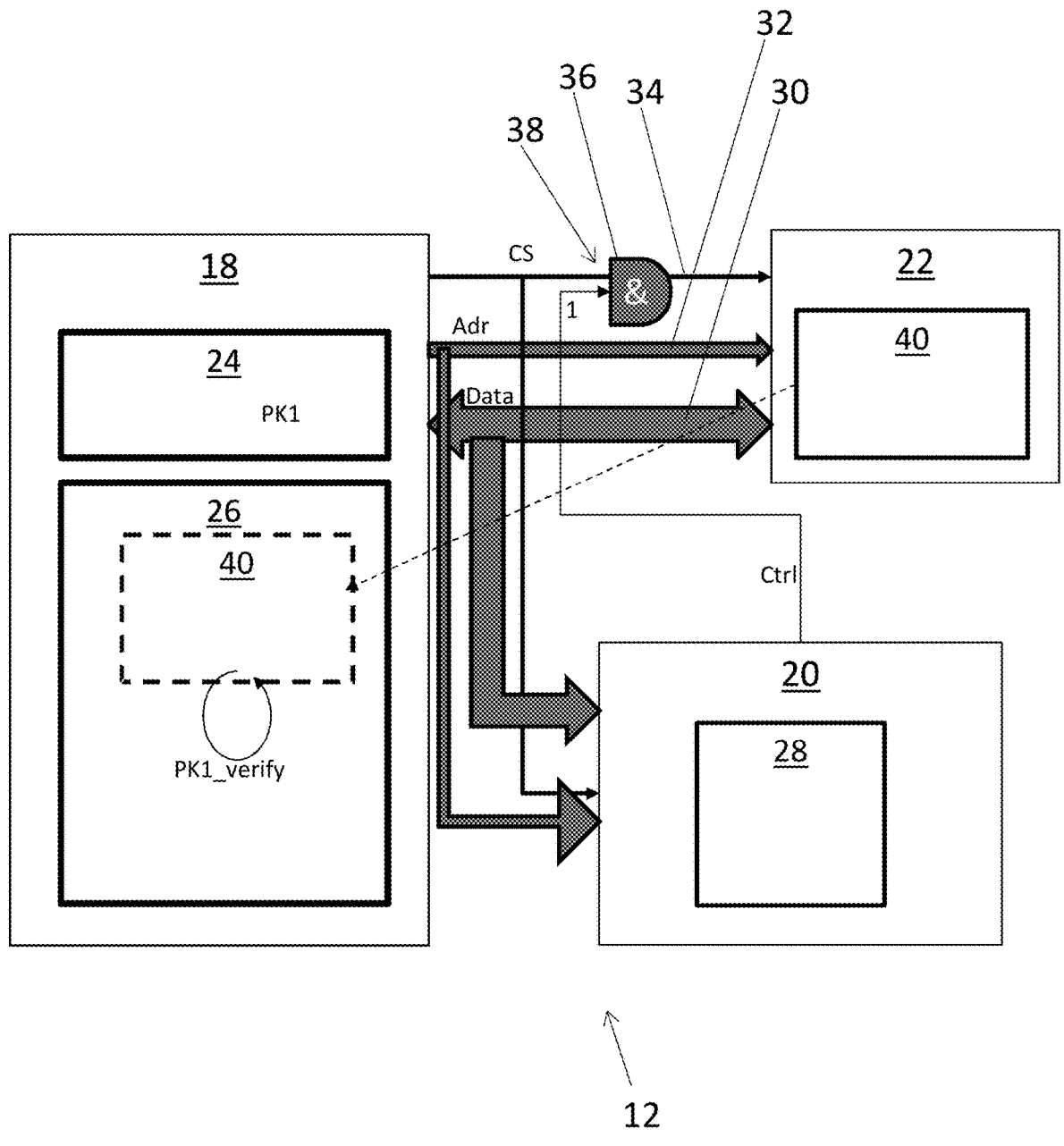
FIG. 2 the ECU in a normal mode.

FIG. 2 shows the ECU 12 in a normal mode. The normal mode may be present after the manufacturing of the vehicle 10.

The ECU 12 comprises a microprocessor 18, a microcontroller 20 and a flash memory 22.

The microprocessor 18 comprises an OTP-ROM 24 (one time programming-read only memory) in which a first public key PK1 (i.e. a first security artifact) is permanently stored. The microprocessor 18 further comprises a volatile random access memory, RAM, 26. The microcontroller 20 comprises a secure flash memory 28, whereas the flash memory 22 may be unprotected.

The microprocessor 18, the microcontroller 20 and the flash memory 22 are connected via a data bus 30 and an address bus 32.

A chip select line 34 which is connected to the flash memory 22 comprises an AND-gate 36, wherein the inputs 38 of the AND-gate 36 are connected to the microprocessor 18 and the microcontroller 20, respectively.

When the vehicle 10 and thus the ECU 12 are started, first a start-up of the microcontroller 20 is performed. The microcontroller 20 then determines that the normal mode is present and switches its input 38 to a high state to allow the chip select line 34 to be switched by the microprocessor 18. Thereafter, the microprocessor 18 performs its start-up and also switches its input 38 to a high state thereby switching on the chip select line 34 and enabling the flash memory 22.

The microprocessor 18 then copies a first program 40 (e.g., a bootloader) from the flash memory 22 into its RAM 26.

When stored in the RAM 26, the first program 40 is verified using the first public key PK1 (or—in general—the first security artifact) from the OTP-ROM 24. This is indicated by arrow PK1_verify. PK1_verify thus indicates the verification of a cryptographic signature. If the first program 40 is successfully verified using the first public key PK1, the first program 40 is executed by the microprocessor 18 and, for example, an ACC-function of the vehicle 10 is performed.

Figure 3:
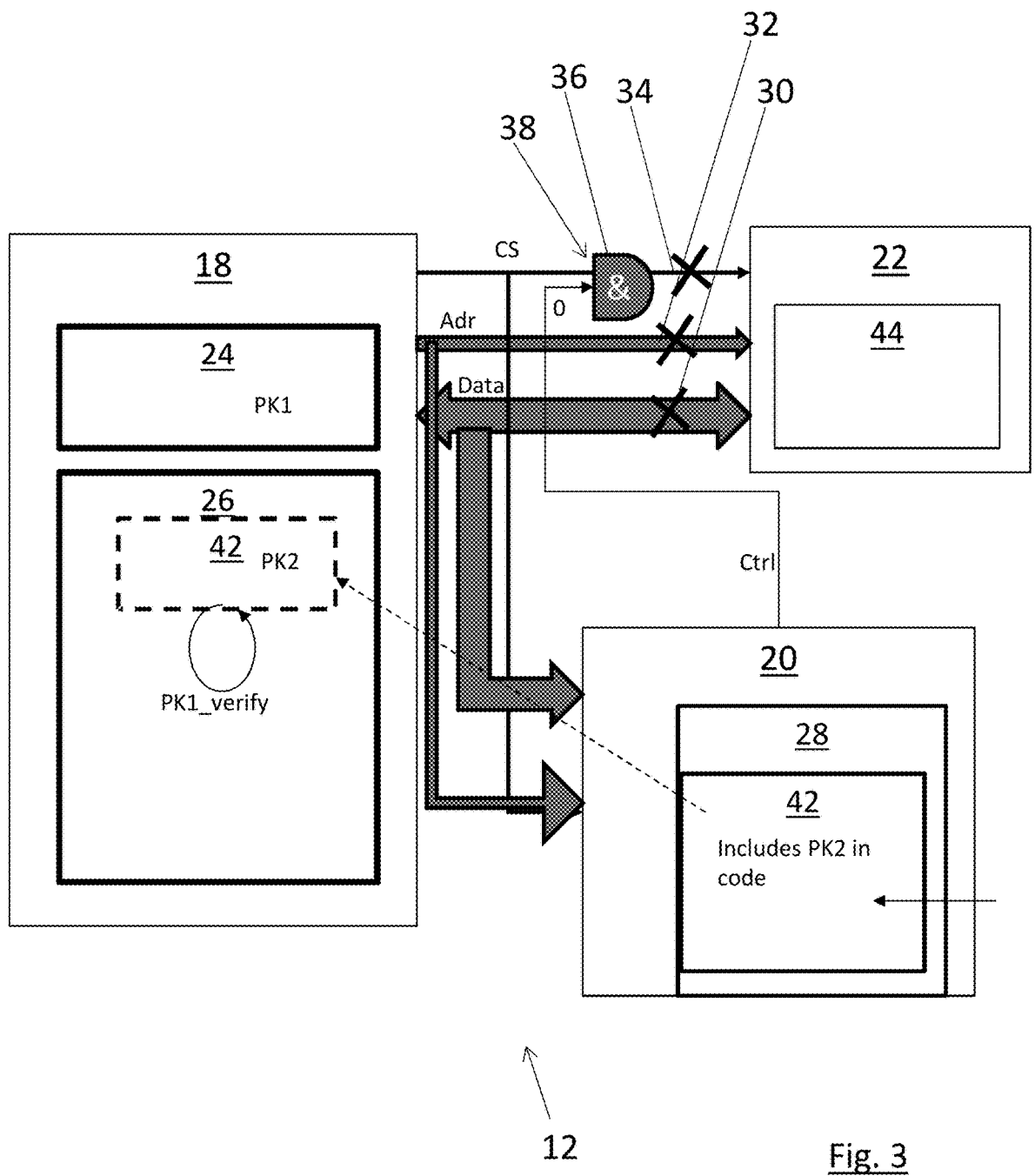
FIG. 3 the ECU in a protected mode during a first step.

FIG. 3 shows the ECU 12 in a protected mode. In this case, the car manufacturer may have determined that the private key necessary to sign the first program 40 has been stolen and thus the first program 40 might be corrupted by an attacker. The car manufacturer may then provide "over the air", i.e. via antenna 16, a bootstrap 42 that includes a second security artifact. The bootstrap 42 also comprises a second public key PK2. The bootstrap 42 is signed with the first private key by the car manufacturer. The bootstrap 42 is first stored in the secure flash memory 28 of the microcontroller 20.

Figure 4:
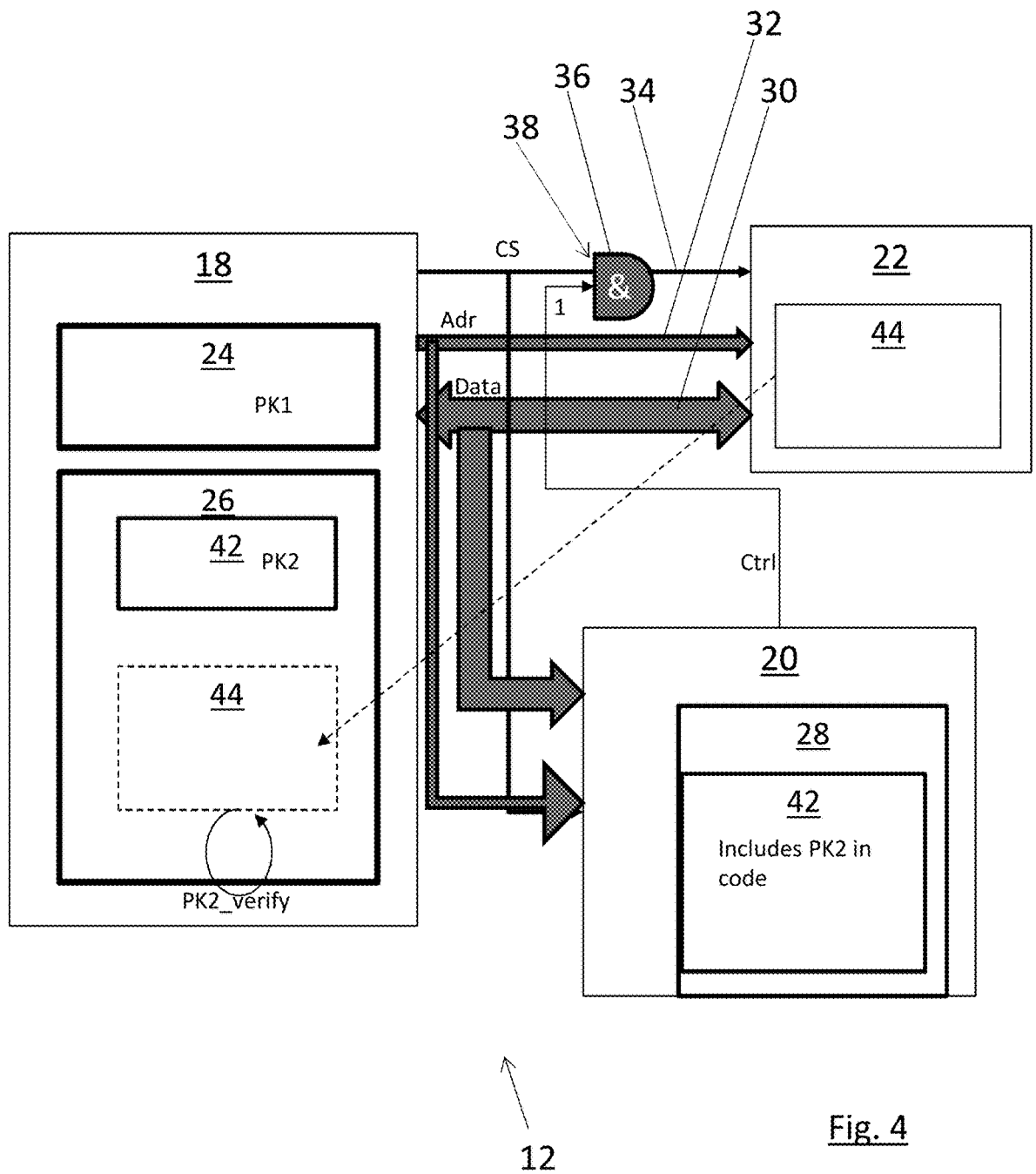
FIG. 4 the ECU in a protected mode during a second step.

During a start-up of the microcontroller 20, the microcontroller 20 detects the bootstrap 42 and switches to protected mode, wherein the microcontroller 20 pulls its input 38 of the AND-gate 36 to a low level thereby not allowing access to the flash memory 22 anymore, as is shown in FIG. 4. Thereafter, the microprocessor 18 performs its start-up and requests the first program 40 via the data bus 30. The microcontroller 20 now responds to this request and sends the bootstrap 42 together with the second public key PK2 instead of the first program 40 to the microprocessor 18. The bootstrap 42 is then loaded into the RAM 26 of the microprocessor 18 and is verified using the first public key PK1 (PK1_verify). Since the bootstrap 42 is signed with the first private key, the microprocessor 18 accepts the bootstrap 42 as the first program 40 and executes the bootstrap 42 thereby storing the second private key PK2.

The bootstrap 42 causes the microprocessor 18 to load a second program 44 (e.g., a bootloader) from the flash memory 22 into the RAM 26. To allow the microprocessor 18 to transfer the second program 44, the microcontroller 20 switches its input 38 to a high level after the bootstrap 42 has been transferred to the microprocessor 18. The second program 44 may be distributed by the car manufacturer together with the bootstrap 42. The second program 44 may be a bootloader that allows the microprocessor to perform the ACC-functions, wherein the second program 44 is signed with a second private key PK2 (from the second security artifact). The second private key of the second program 44 and the second public key PK2 of the bootstrap 42 are used as a key pair. Therefore, once the second program 44 has been transferred to the RAM 26 of the microprocessor 18, the second program 44 is verified using the second public key PK2. This is indicated in FIG. 4 as PK2_verify. As an example, PK2_verify thus indicates the verification of a cryptographic signature based on the second security artifact. After a successful authentication of the second program 44, the second program 44 may be executed by the microprocessor 18.

Due to the bootstrap 42 and the second public key PK2 included in the bootstrap 42, the chain of trust may be ensured even after the loss of the first private key PK1. An attacker thus cannot use the stolen first private key anymore to sign the second program 44 as the microprocessor 18 will only accept a second program 44 that is signed with the second private key (which the attacker does not possess).

Thereby, a protection against a single attack vector, i.e. the loss of the first private key, is achieved. The security of the ECU 12 and thereby of the whole vehicle 10 is thus increased.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method for protecting an electronic control unit including a microprocessor, a microcontroller and a storage memory, the method comprising:
   storing a first security artifact in the microprocessor,
   storing a first program that is based on the first security artifact in the storage memory, and
   controlling, by the microcontroller, whether the microprocessor receives a transfer in a normal mode or a protected mode, wherein
   in the normal mode:
   the first program is transferred from the storage memory to the microprocessor,
   the microprocessor authenticates the first program based on the first security artifact, and
   in case the first program is successfully authenticated, the microprocessor executes the first program, and
   in the protected mode:
   a second security artifact is stored in the microcontroller,
   the second security artifact is transferred from the microcontroller to the microprocessor,
   a second program is transferred from the storage memory to the microprocessor, and
   after having received the second security artifact, the microprocessor uses the second security artifact for authenticating the second program.

2. The method of claim 1, wherein
   the microprocessor makes a request for the transfer of the first program, and
   in the protected mode the request is redirected to the microcontroller.

3. The method of claim 1, wherein
   the first security artifact comprises a first public key,
   the first program is signed with a first private key, and
   the first public key and the first private key form a first key pair.

4. The method of claim 1, wherein
   the second security artifact comprises a second public key,
   the second program is signed with a second private key, and
   the second public key and the second private key form a second key pair.

5. The method of claim 1, wherein the second security artifact comprises a bootstrap based on the first security artifact and the microprocessor verifies at least part of the second security artifact based on the first security artifact.

6. The method of claim 1, wherein the first security artifact is stored in the microprocessor in an unchangeable manner.

7. The method of claim 1, wherein
   the protected mode is entered when the microcontroller receives the second security artifact, and
   the second security artifact is stored in a secure memory of the microcontroller.

8. The method of claim 1, wherein
the second program is stored in the storage memory, and the second program is based on the second security artifact.

9. The method of claim 1, wherein, after being verified by the microprocessor, at least one of the first program and the second program is stored in a volatile memory of the microprocessor.

10. The method of claim 1, wherein
the normal mode and the protected mode are respectively executed during a boot-phase of the ECU, and
a start-up of the microcontroller is performed before a start-up of the microprocessor.

11. An electronic control unit (ECU), comprising:
a microprocessor,
a microcontroller, and
a storage memory including at least a first program that is based on a first security artifact, and
wherein
the microprocessor stores the first security artifact,
the ECU has a normal mode and a protected mode,
the microcontroller controls whether the ECU operates in the normal mode or the protected mode;
during the normal mode:
    the microprocessor receives the first program from the storage memory,
    the microprocessor authenticates the first program based on the first security artifact, and
    in case the first program is successfully authenticated, the microprocessor executes the first program; and
during the protected mode:
    the microcontroller stores a second security artifact and transfers the second security artifact to the microprocessor,
    the microprocessor receives a second program from the storage memory, and
    the microprocessor uses the second security artifact for authenticating the second program.

12. The ECU of claim 11, wherein the ECU performs at least one of an autonomous driving function and an adaptive cruise control function.

13. The ECU of claim 11, wherein
the microprocessor comprises a volatile memory for storing the first program but no re-programmable non-volatile memory, and/or
the microcontroller comprises a protected re-programmable non-volatile memory.

14. A non-transitory computer readable medium comprising instructions that when performed by an electronic control unit including a storage memory, a microprocessor and a microcontroller, cause the electronic control unit to perform the method comprising:
storing a first security artifact in the microprocessor,
storing a first program that is based on the first security artifact in the storage memory,
controlling, by the microcontroller, whether the microprocessor receives a transfer in a normal mode or a protected mode, wherein
in the normal mode:
    the first program is transferred from the storage memory to the microprocessor,
    the microprocessor authenticates the first program based on the first security artifact, and
    subsequent to successfully authenticating the first program, the microprocessor executes the first program; and
in the protected mode:
    a second security artifact is stored in the microcontroller,
    the second security artifact is transferred from the microcontroller to the microprocessor,
    a second program is transferred from the storage memory to the microprocessor, and
    after having received the second security artifact, the microprocessor uses the second security artifact for authenticating the second program.

* * * * *